No. 749,562. PATENTED JAN. 12, 1904.
B. F. JOHNSON.
MACHINE FOR COLLECTING INSECTS FROM PLANTS.
APPLICATION FILED JAN. 17, 1902. RENEWED FEB. 3, 1903.
NO MODEL. 2 SHEETS—SHEET 1.
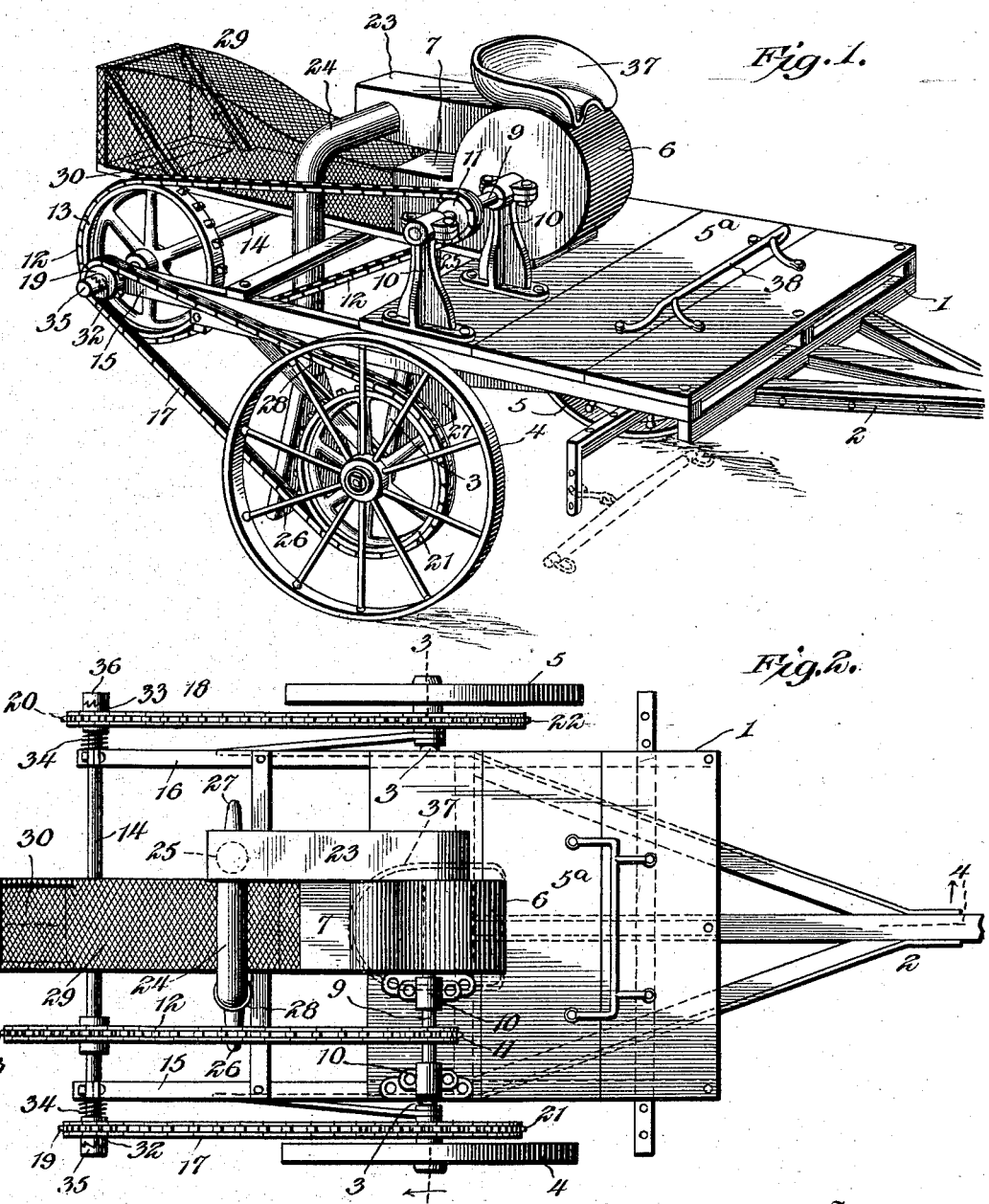

No. 749,562. PATENTED JAN. 12, 1904.
B. F. JOHNSON.
MACHINE FOR COLLECTING INSECTS FROM PLANTS.
APPLICATION FILED JAN. 17, 1902. RENEWED FEB. 3, 1903.
NO MODEL. 2 SHEETS—SHEET 2.

Benjamin F. Johnson, Inventor;

Witnesses
Howard D. Orr.
Louis G. Julihn

Attorney

No. 749,562. Patented January 12, 1904.

UNITED STATES PATENT OFFICE.

BENJAMIN F. JOHNSON, OF BEEVILLE, TEXAS.

MACHINE FOR COLLECTING INSECTS FROM PLANTS.

SPECIFICATION forming part of Letters Patent No. 749,562, dated January 12, 1904.

Application filed January 17, 1902. Renewed February 3, 1903. Serial No. 141,704. (No model.)

*To all whom it may concern:*

Be it known that I, BENJAMIN F. JOHNSON, a citizen of the United States, residing at Beeville, in the county of Bee and State of Texas, have invented a new and useful Machine for Collecting Insects from Plants, of which the following is a specification.

My present invention relates to a novel machine for collecting destructive insects—as, for instance, the cotton-boll weevil—from growing plants.

The object of my invention is to provide a simple device or machine propelled by draft-animals and arranged to shake the plants for the purpose of precipitating insects and infected portions of the plants and to collect the insects and injured forms for subsequent destruction—as, for instance, by fire.

To the accomplishment of this object the invention contemplates the equipment of a wheeled vehicle with suction apparatus operated by the traction of the machine and arranged to draw the insects and infected vegetation through a pair of suction-tubes and to project them into a suitable receptacle having open-work walls through which the dust drawn up by suction will be expelled at a sufficient distance behind the driver to prevent his annoyance.

The invention further contemplates the utilization of the suction-tubes for the purpose of shaking the plants to insure the detachment and precipitation to the ground of the insects and injured forms to be collected.

In the accompanying drawings I have illustrated what is at present considered the preferred form of the invention, to be hereinafter more fully described, and finally defined in the appended claims.

Figure 3:
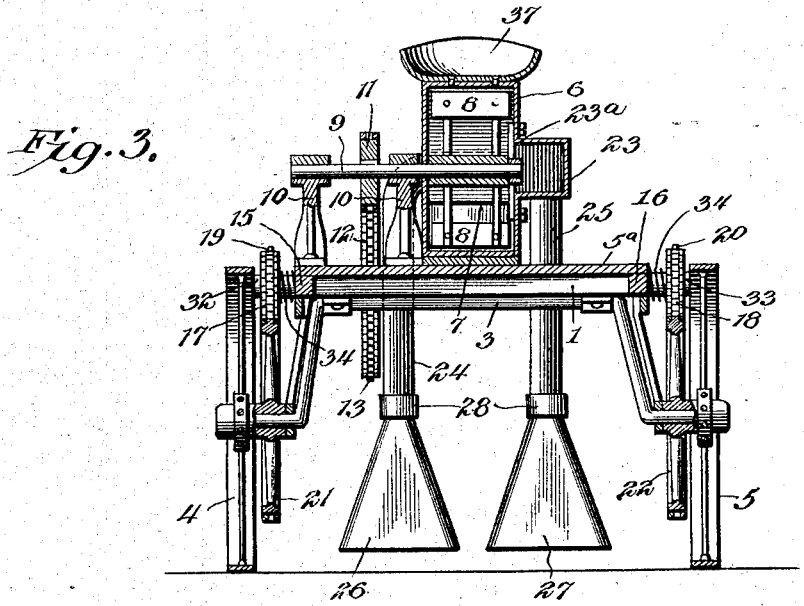
Figure 4:
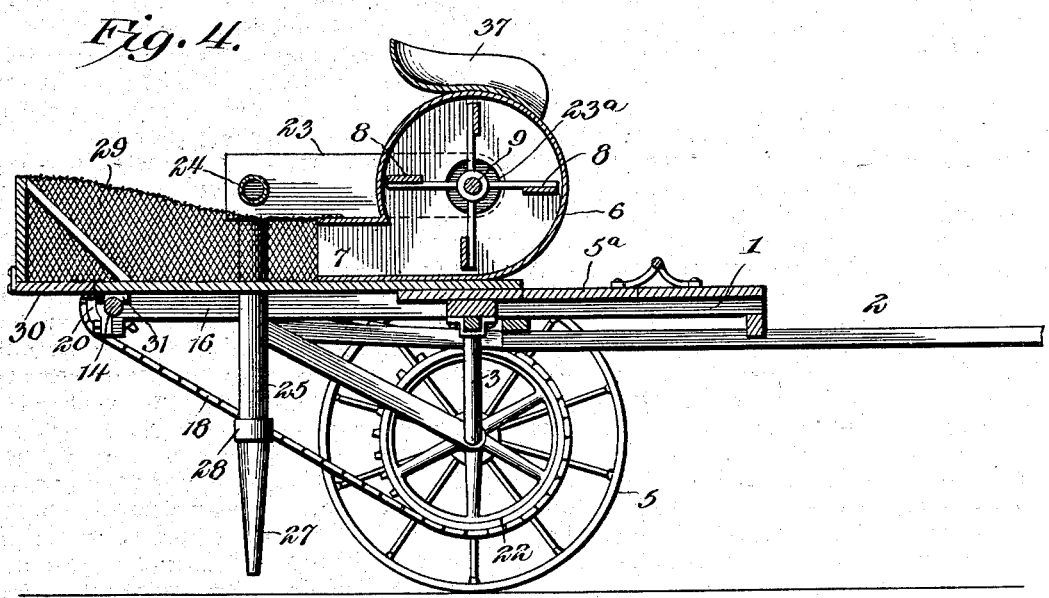

In said drawings, Figure 1 is a perspective view of my machine complete. Fig. 2 is a top plan view thereof. Fig. 3 is a sectional view on the line 3 3 of Fig. 2, and Fig. 4 is a longitudinal vertical section on the line 4 4 of Fig. 2.

Like numerals are employed to designate corresponding parts throughout the views.

It has been stated that the machine is designed to be drawn across a field by draft-animals, and it is therefore constructed generally in the form of a truck or sulky. A suitable frame 1 is equipped with draft appliances 2 and is supported at or about its middle upon a drop-axle 3, supported by a pair of carrying-wheels 4 and 5. The front end of the frame supports a suitable platform 5ª, upon which is mounted the suction apparatus operated by the movement of the wheels 4 and 5 as the machine advances. The suction apparatus which is at present considered preferable is in the form of a fan-casing 6, having its spout 7 rearwardly disposed and containing a fan 8, carried by a fan-shaft 9, journaled at the upper ends of suitable bearing-brackets 10, carried by the platform.

The fan 8 may be geared to the carrying-wheels in any suitable manner; but as it is necessary to operate the fan at a high rate of speed the fan-shaft 9 is preferably provided with a small sprocket-wheel 11, geared, as by a sprocket-chain 12, to a comparatively large sprocket-wheel 13, keyed upon a counter-shaft 14, extending transversely across the frame at the rear end thereof and journaled in suitable bearings upon the extremities of the frame-bars 15 and 16. The counter-shaft 14 is in turn geared to the vehicle-wheels by means of sprocket-chains 17 and 18, passed around small sprockets 19 and 20 on the shaft 14 and considerably larger sprockets 21 and 22, fixed upon the inner ends of the vehicle-wheel hubs. It should be noted, however, that the character of gearing between the fan and vehicle-wheels is susceptible to wide variation, it being possible to substitute a belt or belts in lieu of either or both of the sprocket-chains or to so vary the elements of the gearing as to increase or diminish the speed of the fan, as desired.

At one side of the fan-casing is supported in any suitable manner a rearwardly-extending vacuum-chamber 23, communicating with the fan-casing through an axial opening 23ª in one side of the latter. At its rear end the vacuum-chamber 23 is in communication with a pair of suction tubes or conduits 24 and 25, depending therefrom and provided at their lower ends with flattened and laterally-extended mouthpieces or funnels 26 and 27, connected to the suction-tubes by flexible couplings or conduit-sections 28, which permit the funnels to yield, and thereby prevent injury to the latter in the event of their contacting with a stone, root, stump, or other obstruction. In use these funnels are disposed at opposite sides of a row of plants with their open ends contiguous to the ground, and as their greatest diameters are normally disposed transversely of the machine said funnels will strike the plants as the machine is moved along the row and will shake the insects and injured portions of the plants to the ground, whence they will be drawn up into the funnels and thence through the suction-tubes and vacuum-chamber to the interior of the fan-casing. From the fan-casing the insects and infected vegetation will be blown back through the casing-spout 7 and into a receiver or receptacle 29, extended rearwardly from the fan and preferably having its bottom wall extended under the fan-casing and retained thereby upon the platform.

The side and top walls of the insect receiver or receptacle 29 are preferably of any suitable open-work formation, so that any dust, sand, or other fine debris drawn up by the fan will be permitted to escape at a point a sufficient distance behind the driver to prevent his being annoyed thereby. These open-work walls are preferably formed of wire-netting, as shown.

When it is desired to destroy the collected insects, a small door 30, formed in the bottom wall of the receiver, is opened and the insects are deposited in a suitable sack and afterward burned or otherwise disposed of. For the purpose of lending additional rigidity to the parts the bottom wall of the receiver 29 may be supported in part upon the counter-shaft 14, suitable bearing-blocks 31 being secured to the under side of the receiver to permit this support without opposing undue resistance to the rotation of the shaft.

For permitting the uninterrupted operation of the fan at its proper speed while the machine is being turned at the end of a row the small sprocket-wheels 19 and 20 are provided with clutch-hubs 32 and 33, urged by springs 34 into engagement with clutch collars or heads 35 and 36, mounted upon the opposite ends of the shaft 14. The interfitting projections of the clutch hubs and collars are so disposed that the shaft 14 will be forwardly rotated by the advance of the machine, but will rotate at a higher rate of speed than either sprocket, which may be retarded by the comparatively slight rotation of one of the vehicle-wheels when a turn is being made.

In order to economize space, to locate the driver directly over the axle of the machine, and to utilize his weight for the purpose of overcoming undue vibration of the fan-casing and its connected parts, the driver's seat 37 is mounted directly upon the fan-casing, and a suitable foot-rest 38 is mounted upon the platform in advance thereof.

Briefly, the operation of my machine is as follows: The machine having been positioned so as to dispose the combined funnels and shakers at opposite sides of a row of plants is drawn forward. As the machine advances the funnels will strike against the plants, shaking the insects and infected forms to the ground, the flexible connections between the funnels and the suction-tubes rendering the funnels more or less yielding, and thereby preventing injury to the plants. As the rotation of the vehicle-wheels will effect the operation of the suction-fan at high speed, the insects and injured vegetation shaken to the ground by the funnels will be drawn through the latter and blown back into the receiver 29, from whence the dust and dirt will be projected rearwardly behind the driver. The accumulated insects and forms are removed and destroyed whenever necessary in the manner heretofore explained.

It is thought that from the foregoing the construction and operation of my novel insect detaching and collecting machine will be clearly apparent; but I wish it to be distinctly understood that while the illustrated embodiment of the invention appears at this time to be preferable I reserve the right to effect such changes, modifications and variations, of the illustrated structure as may be suggested by experience and experiment and embraced within the scope of the protection prayed.

What I claim is—

1. In a machine of the character described, the combination with a vehicle, of a receiver, a pair of combined shaking and suction tubes arranged for disposal at opposite sides of a row of plants and provided with yielding downwardly-opening funnels at their lower ends, and a suction device disposed to draw insects and infected vegetation through the tubes and deposit the same in the receiver.

2. In a machine of the character described, the combination with a vehicle, of a receiver, a pair of yieldingly-mounted downwardly-opening funnels arranged for disposal at opposite sides of a row of plants to shake the same as the vehicle advances, and a suction device disposed to draw insects and infected vegetation through said funnels from the ground and deposit the same in the receiver.

3. In a machine of the character described, the combination with a vehicle, of a receiver, a pair of suction-tubes arranged for disposal at opposite sides of a row of plants, downwardly-opening funnels disposed at the lower ends of the tubes, flexible joints connecting the funnels with the tubes to permit lateral yielding of the funnels in order to prevent injury to the latter or to the plants, and a suction device disposed to draw insects and infected vegetation through said funnels from the ground and deposit the same in the receiver.

4. In a machine of the character described, the combination with a vehicle, of a fan-casing mounted thereon, a receiver and a vacuum-chamber both in communication with the fan-casing, a pair of suction-tubes communicating at their upper ends with the vacuum-chamber and extending into close proximity with the ground opposite to which, their open lower ends are disposed, a fan within the casing, and means for operating the fan to draw insects and infected vegetation through the tubes and deposit the same in the receiver.

5. In a machine of the character described, the combination with a vehicle, of a fan-casing mounted thereon, and having its spout rearwardly disposed, an open-work receiver disposed in rear of the spout, a vacuum-chamber communicating with one side of the fan-casing and extended rearwardly, a pair of combined shaking and suction tubes extending from the rear end of the vacuum-chamber and arranged for disposal at opposite sides of a row of plants, downwardly-opening funnels located at the lower ends of said tubes, a fan within the fan-casing, and means for operating the fan through the movement of the vehicle to draw insects and infected vegetation from the ground through the tubes and vacuum-chamber and deposit the same in the receiver.

6. In a machine of the character described, the combination with a vehicle, of a receiver, a suction-tube, a downwardly-opening flat-sided funnel located at the lower end of the suction-tube to constitute a shaker for the plants, and a suction device disposed to draw insects and infected vegetation through the funnel and tube and deposit the same in the receiver.

7. In a machine of the character described, the combination with a vehicle, of a receiver, a pair of suction-tubes arranged for disposal at opposite sides of a row of plants, downwardly-opening flat-sided funnels located at the lower ends of the tubes and having their greatest diameters disposed transversely of the machine, and a suction device disposed to draw insects and infected vegetation through the funnels and deposit the same in the receiver.

8. In a machine of the character described, the combination with a vehicle, of a receiver mounted thereon and having open-work walls, a pair of suction-tubes depending at opposite sides of the receiver for disposal at opposite sides of a row of plants, downwardly-opening flat-sided funnels located at the lower ends of the tubes with their greatest diameters disposed transversely of the machine and constituting shakers for the plants, flexible joints connecting the tubes and funnels to permit lateral yielding of the latter, and a suction device disposed to draw insects and infected vegetation through the tubes and deposit the same in the receiver.

9. In a machine of the character described, the combination with a wheeled vehicle, of a receiver mounted thereon and having open-work walls, a pair of pendent suction-tubes located at opposite sides of the receiver, downwardly-opening funnels having flexible connection with the lower ends of the tubes to yield laterally, a fan-casing in communication with the tubes and receiver, respectively, a fan within the fan-casing, and gearing between a vehicle-wheel and said fan, whereby the advance of the vehicle will cause the plants to be shaken by contact with the funnels and will operate the fan to draw insects and infected vegetation through the suction-tubes from the ground and deposit the same in the receiver.

10. In a machine of the character described, the combination with a vehicle comprising a frame and carrying-wheels, of a fan-casing mounted on the frame, a fan-shaft piercing the casing, a fan mounted on the shaft, a counter-shaft located at the rear end of the frame, gearing connecting the counter-shaft with the fan-shaft and with one of the vehicle-wheels, a receiver extending rearwardly from the spout of the fan-casing, suction-tubes disposed at opposite sides of the receiver, downwardly-opening flat-sided funnels having flexible connection with the lower ends of the tubes to yield laterally, and a vacuum-chamber having communication with said tubes and with the fan-casing, whereby insects and infected vegetation may be drawn up through the tubes from the ground adjacent to the plants and deposited in the receiver by the action of the fan as the vehicle advances.

11. In a machine of the character described, the combination with a vehicle comprising a frame and wheels, of a fan-casing mounted on the vehicle, a receiver extending from the spout of the casing, a pair of vertically-disposed, downwardly-opening suction-tubes communicating with the casing and arranged for disposal at opposite sides of a row of plants, a fan within the casing, a fan-shaft carrying the fan, a counter-shaft disposed at one end of the vehicle-frame and geared to the fan-shaft, sprocket-wheels connected to each of the vehicle-wheels, clutch-collars fixed to the counter-shaft, comparatively small sprocket-wheels splined upon the counter-shaft and having clutch-hubs disposed for engagement with the clutch-collars on said shaft, springs disposed to urge the clutch-hubs and collars into engagement, and sprocket-chains gearing the vehicle-wheel sprockets with the small sprockets on the counter-shaft, whereby the retardation of one of the vehicle-wheels in turning the vehicle at the end of a row will not effect the retardation of the fan.

12. In a machine of the character described, the combination with a vehicle comprising a frame, an axle, and carrying-wheels, of a fan-casing mounted on the vehicle directly above the axle, a driver's seat mounted on the fan-casing, a receiver, suction-tubes communicating with the fan-casing and having downwardly-opening funnels, a fan within the casing, and means for operating the fan to draw the insects from the ground.

13. In a machine of the character described, the combination with a vehicle, of a receiver, a suction-tube arranged for disposal adjacent to a row of plants and provided with a yieldingly-mounted downwardly-opening funnel at its lower end, and a suction device disposed to draw insects and infected vegetation through the tube from the ground and deposit the same in the receiver.

14. In a machine of the character described, the combination with a vehicle, of a fan-casing mounted thereon, a receiver and a vacuum-chamber both in communication with the fan-casing, a downwardly-opening suction-tube communicating at its upper end with the vacuum-chamber and extending into close proximity to the ground, a fan within the casing, and means for operating the fan to draw insects and infected vegetation through the tube from the ground and deposit the same in the receiver.

15. In a machine of the character described, the combination with a vehicle, of a fan-casing mounted thereon, and having a rearwardly-disposed spout, an open-work receiver disposed in rear of the spout, a vacuum-chamber communicating with one side of the fan-casing and extended rearwardly, a suction-tube extending from the rear end of the vacuum-chamber, and arranged for disposal adjacent to a row of plants, a downwardly-opening funnel located at the lower end of said tube, a fan within the casing, and means for operating the fan.

16. The combination of a frame supported by wheels, a receptacle mounted upon said frame, a conduit including a flexible section extending from the receptacle toward the ground, means for creating suction through the conduit, and a flattened and laterally-extended mouthpiece for said conduit.

17. The combination of a frame supported by wheels, a receptacle mounted upon said frame, two conduits including flexible sections extending from the receptacle toward the ground, means for creating suction through the conduits, and a flattened and laterally-extended mouthpiece for each conduit.

In testimony that I claim the foregoing as my own I have hereto affixed my signature in the presence of two witnesses.

BENJAMIN F. JOHNSON.

Witnesses:
L. B. RANDALL,
J. M. LOTT.